A. H. PENCE.
MARINE TABLE.
APPLICATION FILED JUNE 14, 1909.

938,695.

Patented Nov. 2, 1909.

Witnesses

Inventor
Alonzo H. Pence.

Attorneys

UNITED STATES PATENT OFFICE.

ALONZO H. PENCE, OF SOMERVILLE, ALABAMA.

MARINE TABLE.

938,695.

Specification of Letters Patent. Patented Nov. 2, 1909.

Application filed June 14, 1909. Serial No. 502,085.

*To all whom it may concern:*

Be it known that I, ALONZO H. PENCE, a citizen of the United States, residing at Somerville, in the county of Morgan and State of Alabama, have invented a new and useful Marine Table, of which the following is a specification.

This invention has relation to tables adapted especially to be used upon shipboard, and it consists in the novel construction and arrangement of its parts as hereinafter shown and described.

The object of the invention is to provide a mounting or support for a table the parts of which are so arranged as to permit the table to remain in a horizontal position irrespective of the rock or pitch of the vessel.

With the above object in view the structure comprises a socket member made up of binary component parts, one of which is provided with a laterally disposed slot. A shaft is provided with a ball which is retained in the said socket member, and the shaft is free to turn upon its axis and also to swing laterally with relation to the socket member, and also is free to enter the slot provided in one of the parts thereof. Seats are carried by the shaft, as is also a platform, and table supports are hingedly connected with the platform, whereby the same may be collapsed in a measure when it is desired to swing the structure against the under side of a desk when not in use.

Figure 1:
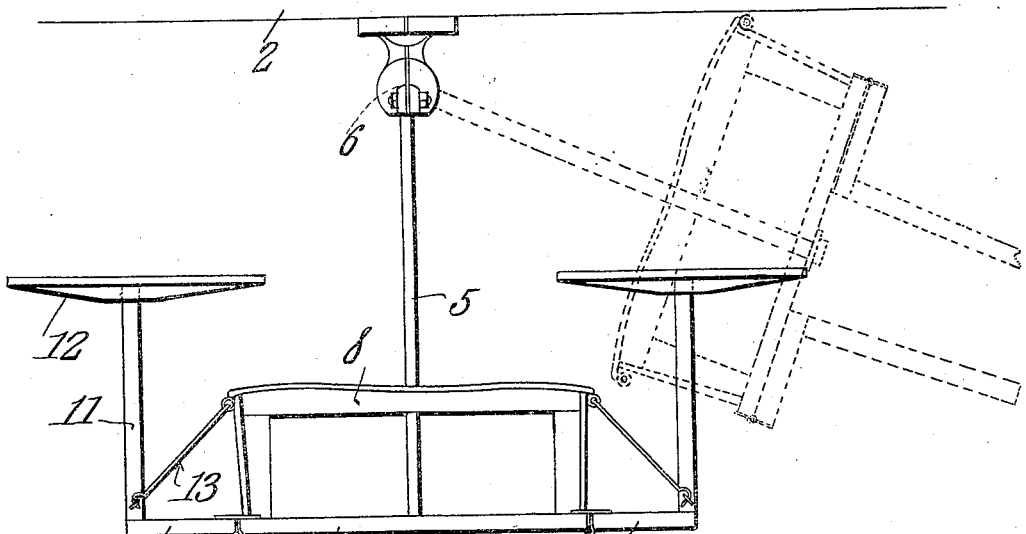
Figure 3:
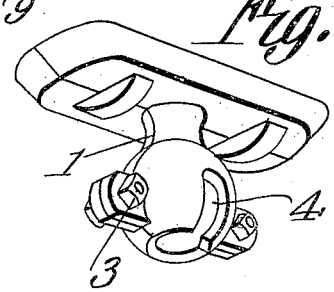
Figure 2:
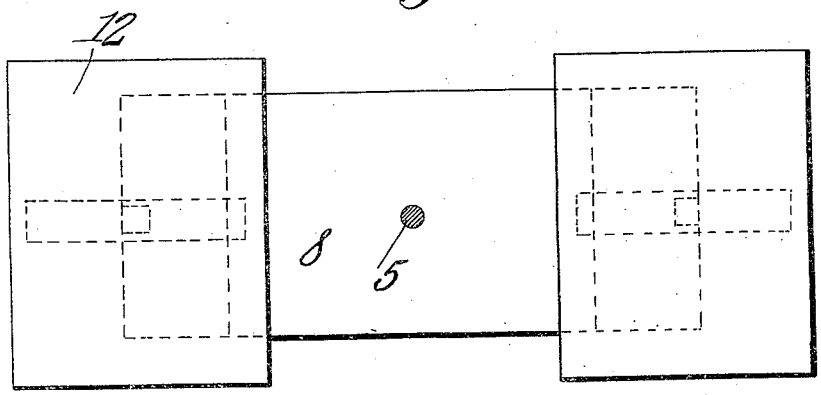

In the accompanying drawings:—Figure 1 is a side elevation of the marine table. Fig. 2 is a top plan view of the same, showing the supporting shaft in section. Fig. 3 is a perspective view of the socket member.

The socket member 1 is adapted to be secured to the under side of a deck 2. Said socket member consists of binary component parts, which are secured together by a bolt 3, and one of which is provided with a laterally disposed slot 4. A shaft 5 is provided at its upper end with a ball 6 which is confined in the socket member 1 in the usual manner, as the assemblage of the parts of a ball and socket joint. The shaft depends from the member 1 but is free to turn upon its axis with relation thereto, and is also free to swing laterally at its lower portion with relation to the said socket member. The said shaft 5 is also of such diameter that it may readily enter the slot 4 provided in one of the parts of the socket member 1.

A platform 7 is attached to the lower portion of the shaft 5, and seats 8 are mounted upon the platform 7 at the opposite sides of the said shaft. The outer portions 9 of the platform 7 are hingedly connected with the inner portion thereof, as at 10, and are provided with uprights 11 upon which table-tops 12 may be positioned or mounted. Hooks or other securing devices 13 are provided to hold the outer portions 9 of the platform 7 in proper positions with relation to the inner portion thereof when the table is in use.

When the table is not in use and it is desired to position the same so that the room below the deck will not be interfered with or obstructed by the structure, the hooks 13 may be loosened and the outer portions 9 of the platform 7 may be swung back upon the intermediate portion thereof in the manner as indicated in dotted lines in Fig. 1, and when the parts are so positioned the shaft 5 may be swung laterally at its lower portion with relation to the socket 1, whereby the upper portion of the said shaft is caused to enter the slot 4 in the socket member 1, and the platform 7 is swung adjacent the ceiling of the deck. When so positioned the parts may be secured by any usual means. When the table is in use the parts are positioned as illustrated in heavy lines in Fig. 1, when it will be seen that the seats 8 may be occupied by persons who may partake of repasts spread upon the table-top 12. When the parts hang pendent as illustrated in Fig. 1 of the drawings, the shaft 5 is free to turn upon its axis with relation to the socket member 1, and as the deck tilts with the rock or roll of the vessel, the table top 14 will remain in level position.

Having described my invention, what I claim as new and desire to secure, by Letters Patent, is:—

A marine table comprising a socket member, a shaft having a ball end confined in the socket member and free to rotate upon its axis and to swing laterally with relation to the socket member, a platform attached to the shaft and having hinged sections, and table supports carried by the hinged sections.

In testimony that I claim the foregoing as my own, I have hereto affixed my signature in the presence of two witnesses.

ALONZO H. PENCE.

Witnesses:
J. A. MOORE, Jr.,
ADA H. FRENCH.